United States Patent [19]
Storm et al.

[11] 3,979,853
[45] Sept. 14, 1976

[54] FISHING LURE

[75] Inventors: William D. Storm; Gary D. Storm, both of Norman, Okla.

[73] Assignee: Storm Plastics, Inc., Norman, Okla.

[22] Filed: Nov. 1, 1974

[21] Appl. No.: 519,850

[52] U.S. Cl. ............................ 43/42.29; 43/42.09; 43/42.31; 43/42.39
[51] Int. Cl.² ........................................ A01K 85/00
[58] Field of Search ............ 43/42.28, 42.29, 42.31, 43/42.09, 42.37, 42.24, 42.3, 42.06, 42.39

[56] References Cited
UNITED STATES PATENTS

| | | | |
|---|---|---|---|
| 2,270,487 | 1/1942 | Withey | 43/42.31 |
| 2,278,876 | 4/1942 | Hart | 43/42.09 |
| 2,503,672 | 4/1950 | Johnson et al. | 43/42.28 |
| 2,519,338 | 8/1950 | Arnold | 43/42.29 |
| 2,931,123 | 4/1960 | Jensen, Jr. | 43/42.28 |
| 2,983,065 | 5/1961 | Ferguson et al. | 43/42.09 |
| 3,218,750 | 11/1965 | Lewin | 43/42.28 |
| 3,854,233 | 12/1974 | Browning | 43/42.29 |
| 3,861,073 | 1/1975 | Thomassin | 43/42.37 |

*Primary Examiner*—Warner H. Camp
*Attorney, Agent, or Firm*—William R. Laney

[57] ABSTRACT

A fishing lure which includes a rigid body of generally fish-shaped configuration tapering from mid-section to tail, and an elongated, flexible resilient streamer element connected to the tail of the rigid flotation body.

5 Claims, 5 Drawing Figures

FISHING LURE

BACKGROUND OF THE INVENTION

1. Field of the Invention

This invention relates to fishing lures, and more particularly, to lures having a rigid body to which one or more hooks are attached, and in the case of the present invention, to which an elongated, flexible, resilient streamer element is secured.

2. Brief Description of the Prior Art

Before and since the days of Isaac Walton, anglers of every degree of competence and expertise have endeavored to contrive baits and lures which will attract and catch various members of the finny tribe. In more recent times, with the increase of leisure time available to the average individual, industries have been founded upon the manufacture and sale of effective fish baits and lures. Success in such enterprises has been found to depend not merely on the offering of lures which will attract and catch fish, but also upon the development of lures which appeal to the fishermen who constitute the market for them. In some instances, the latter desideratum has prevailed over the former in determining the success with which a given lure has met when first offered.

The types of baits and lures now most widely marketed and used can be thought of as broadly divisible into several classes or types. One of these can be called plugs or hard body lures. These lures generally include a body constructed of a rigid material, such as wood or plastic, and further include one or more hooks suspended from the body. The body is usually designed with two major characteristics or properties in mind. These are the aesthetic and functional appearance of the lure body (to both the fish and the fisherman), and the action which is characteristic of the lure as it is fished. As to appearance, the lure body is often made to resemble a minnow or small fish upon which the game fish to be caught by the lure often feed. Other shapes have also been found effective for the attraction of fish.

With respect to the action of the hard body lure in the water, efforts are often directed to the provision of hydrofoils on the body which will cause the lure to simulate the swimming action of some sort of live forage. Various actions are thought to be attractive to various species of fish. In a popular type of lure now marketed, a spoon, bill or diving plane is provided on the forward portion of a streamlined, fish-shaped lure body, and a lure attachment eyelet is secured in the forward end of the lure body. The lure body, in such cases, is often made of a relatively light or buoyant material, or is designed to include a hollow air space in the interior of the lure which allows the lure body to float when it is in a state or at-rest status. During the retrieve of the lure through the water by reeling in or pulling on the line attached to the eyelet at the nose or forward end thereof, such lures will frequently undergo a diving action, or a combined diving and floating action with the lure seeking a greater depth as it is pulled, and then floating to the surface as the tension on the retrieving line is relieved. These types of floater-diver lures have been very successful, in many instances, in catching such fish as bass, trout, crappie, salmon and the like. Another related version has a rigid body which is designed to allow the lure to be retrieved while remaining at some depth below the surface of the water, and which does not float at rest.

Another type or category of lure which is widely used by present-day fishermen are lures constructed of an elastomeric, rubbery-like material which is capable of flexing and wiggling movement as the lure is moved through the water on retrieve. These types of lures are sometimes referred to as worms as a result of their resemblence to elongated, oversized earthworms, but in other instances, have been molded to provide a shape resembling a crayfish, a small minnow or various other types of forage species constituting the food sources of various game fish.

The two types or categories of lures described are generally represented in every fisherman's repertoire of baits, and each has its advocates, and each is recognized as having effectiveness when certain species of fish are the object of the fisherman.

One of the types of baits formed of elastomeric material which has recently achieved success is an elongated, relatively thin strip of an elastic, synthetic resin material such as polyvinyl chloride, which strip is formed by molding so as to have a crenulation in one side edge of the strip, or is formed with one of the side edges of shorter length than the other, with a resulting curvature existing over the length of the strip. This curved elastomeric strip, when pulled through the water on retrieve, undergoes distortion such that the portion of the strip adjacent the relatively long side edge of the strip is placed in compression, or is wrinkled as the strip tends to be straightened out. The elastic deformation thus effected then results in a reaction which whips the strip back in the opposite direction, tending to relieve the compression loading. This sequence of distortion loading in one direction, following by whipping or lashing back in the opposite direction, is repeated with a fairly constant period of oscillation during a constant retrieve - that is, a retrieve in which the tension on the lure is constant. The result is a motion in the water which is relatively regular, and which resembles a swimming worm or minnow species. The action has been found to be quite attractive to many types of fish.

BRIEF DESCRIPTION OF THE PRESENT INVENTION

The present invention comprises a novel fishing lure which realizes, in a synergistic fashion, many of the advantages which have been attributed in the past both to hard body lures and to elastomeric worm type lures. Broadly described, the lure of the invention comprises a rigid body which tapers from a relatively large diameter mid-section to a relatively thin tail, and which has connected to the tail, an elongated, flexible resilient streamer element which streams behind the flotation body during retrieve of the lure by the fisherman. The lure further includes one or more hooks which are secured to the rigid flotation body, and an eyelet, placed on the forward end of the body for the attachment of the fishing line used for retrieving the lure. Both the rigid body and the streamer element can, within the broad principles of the invention, assume various forms.

In a preferred embodiment of the invention, the elongated, flexible resilient streamer element connected to the tail of the rigid body is an elongated strip of elastic, synthetic resin material of the type hereinbefore generally described, and having a curvature in the strip resulting in one of the side edges thereof being longer than the other side edge thereof. Further, in a preferred embodiment of the invention, the elongated, flexible resilient streamer element is most suitably quick-detachably secured to the rigid flotation body so that streamer elements of different shapes and different colors can be interchangeably used on the lure as the fisherman may select.

It is an object of the present invention to provide an improved fishing lure which includes a rigid flotation body and an elongated resilient streamer element secured to the rear end of the body, and deriving from such combination, advantageous results in attracting fish by characteristics which are normally attributable to either a rigid flotation body or a resilient streamer element, but not to both.

A further object of the invention is to provide a generally fish-shaped rigid flotation body as a fishing lure, detachably securing to the body, an elongated, flexible resilient streamer element in such a way that the streamer element accentuates the swimming motion of the body, but does not interfere with the basic actions of the body as achieved when the resilient streamer element is not connected thereto.

A further object of the invention is to provide a compound fishing lure having a rigid flotation body with an elongated resilient streamer element of worm-like configuration attached, which streamer element can be quickly removed and replaced by a different type of streamer element, as fishing conditions may demand.

An additional object of the invention is to provide a fishing lure which can be relatively economically constructed, and which is of substantial mechanical strength to facilitate fishing in brushy waters without destruction or loss of the lure.

Additional objects and advantages of the invention will become apparent as the following detailed description of a preferred embodiment of the invention is read in conjunction with the accompanying drawings which illustrate the invention.

DETAILED DESCRIPTION OF A PREFERRED EMBODIMENT OF THE INVENTION

Figure 1:
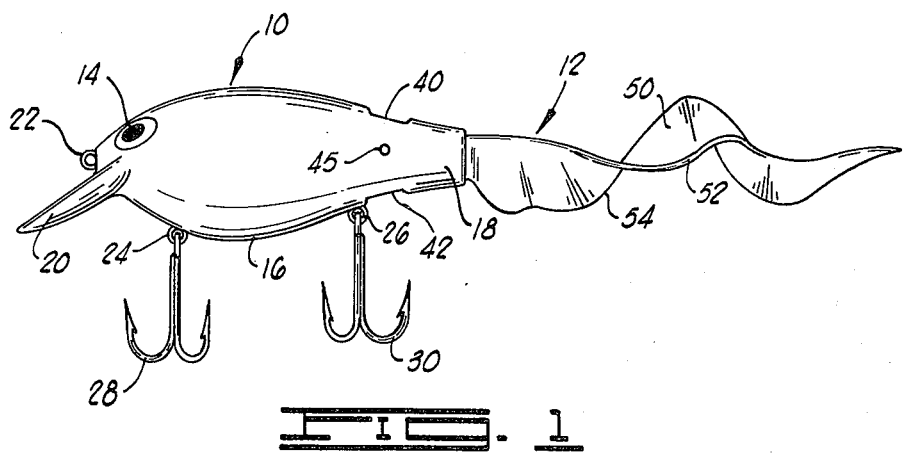
FIG. 1 is a side elevation view of a fishing lure constructed in accordance with the present invention, and illustrating the resilient streamer element forming a part of the fishing lure streaming in a manner similar to that which results when the lure is retrieved through the water.

Referring initially to FIG. 1 of the drawings, shown therein is a fishing lure constructed in accordance with the invention and constituting one embodiment thereof, with such fishing lure including a rigid flotation body 10 having secured to the rear end thereof, an elongated, flexible resilient streamer element 12.

The illustrated embodiment of the invention is a lure in which the rigid flotation body 10 is configured to resemble a minnow or small fish and thus has an eye 14, an under belly 16 and a tail portion 18. Formed on the body 10 at the forward end thereof is a downwardly and forwardly inclined lip or diving plane 20. Positioned just above the diving plane 20 in the nose of the rigid flotation body is an eyelet 22 which is glued into the body and constitutes an anchor point or point of securement for the fishing line (not shown) used for retrieving the lure. A pair of hook hanger eyelets 24 and 26 are glued into the under belly 16 of the body 10, and these hook hanger eyelets have secured thereto, a pair of downwardly depending treble hooks 28 and 30.

Figure 2:
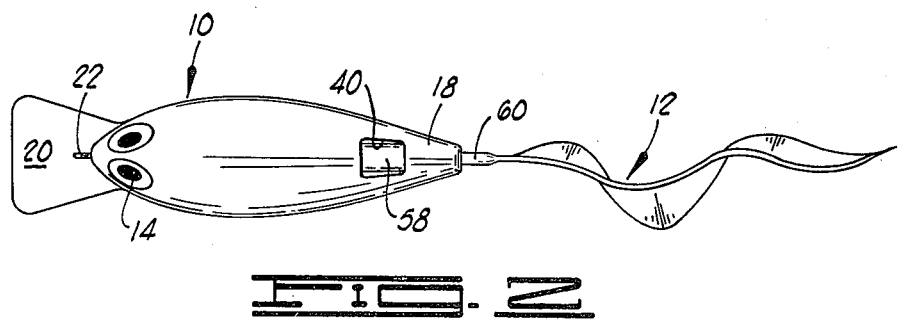
FIG. 2 is a plan view of the fishing lure depicted in FIG. 1.
Figure 3:
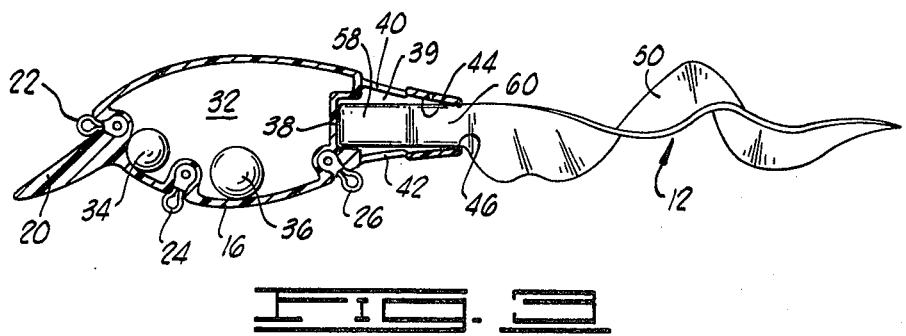
FIG. 3 is a vertical sectional view through the center of the rigid flotation body forming a part of the fishing lure of the present invention, and illustrating the interior of the body and the manner in which the elongated, flexible resilient streamer element (shown in elevation) is connected to the body.

Further understanding of the manner in which the flotation body 10 is formed can be gained by reference to FIGS. 2 and 3. Here it will be noted that the body 10 is hollow and includes an interior air chamber 32 containing a plurality of small lead shot or weights 34 and 36 loosely confined in the chamber. At the after or rear side of the air chamber 32, a partition wall 38 provides a closure of the chamber and defines the forward side of a passageway 39 extending completely through the body 10 in the illustrated embodiment of the invention. The passageway 39 has an opening 40 at the upper side of the rigid body and just to the rear of the hook hanger 26. Internally of the body 10, the passageway 39 between the openings 40 and 42 is defined by a space between the opposed side walls of the lure body. To the rear of this vertically extending passageway 39 terminating in the openings 40 and 42 in the lure body, a rearwardly extending passageway 44 extends to the extremity of the tail portion 18 of the body and terminates in an opening 46 in the tail portion of the body. The passageways 39 and 44 together form a substantially T-shaped passageway when viewed from above the lure (in a horizontal plane), since the passageway 39 has a larger transverse dimension than the passageway 44. A pair of small openings or apertures 45 are formed in opposite sides of the body 10 in alignment with the passageway 39 for accommodation of a securing pin (not shown) in a mode of using the lure hereinafter described.

Figures 4, 5:
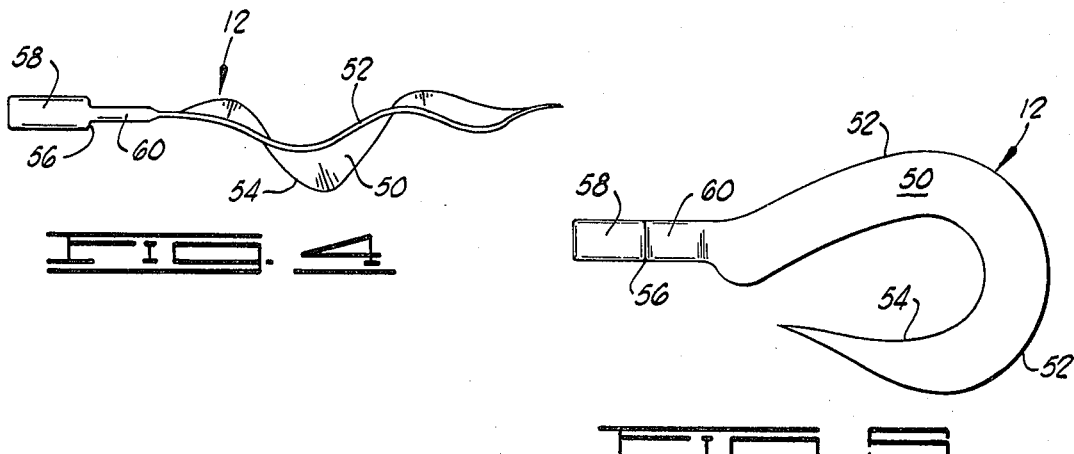
FIG. 4 is a plan view of the elongated, flexible resilient streamer element as it appears in its streaming status.
FIG. 5 is a side elevation view of the elongated, flexible resilient streamer element as it appears in its relaxed or unstressed status.

The elongated, flexible, resilient streamer element 12 is best illustrated in FIGS. 4 and 5, and its manner of attachment or connection to the rigid flotation body 10 best shown in FIGS. 1 and 2. The streamer element 12 is an elongated strip of an elastomeric flexible material, such as rubber or polyvinyl chloride, and is relatively thin over its length. In its relaxed, unstressed state, the elongated resilient streamer element 12 includes a curved section 50 which, in the illustrated embodiment, is generally of hooked or reverse bent configuration. The curved section 50 includes one side edge 52 which is substantially longer than the opposed side edge 54, with the side edges extending substantially parallel to each other over a major portion of the length of the streamer element. At the end of the streamer element remote from the rigid flotation body 10, the side edges 52 and 54 converge, in the illustrated embodiment, to a pointed tip. At its forward end, the streamer element 12 has, molded integrally with the curved portion 50, a relatively thick anchoring pad 56. The anchoring pad 56 includes a relatively thick head 58 and a relatively narrow or thin neck 60. Both the head 58 and neck 60 are larger in every dimension than the thickness of the curved portion 50 of the streamer element 12 and smaller than the width thereof, except the width at the tip of the streamer element.

In assembling the elongated resilient streamer element 12 with rigid flotation body 10, the tip or rear end of the curved portion 50 of the streamer element is first inserted through the opening 40 in the upper side of the flotation body 10 and is then threaded through the passageway 44 extending through the tail portion 18 and terminating in the opening 46. The curved portion 50 of the streamer element can then be pulled to draw the streamer element through the passageway 44 until the anchoring pad 56 seats in the passageway 39 between the upper opening 40 and the lower opening 42. When the streamer element 12 is thus positioned relative to the flotation body 10, the streamer element is held securely in position by reason of the enlarged transverse dimension of the head 58 which prevents the head of the anchoring pad 56 from being pulled through the passageway 44 in the rear end of the flotation body 10.

In the operation of the fishing lure, a fishing line is attached to the eyelet 22 set in the nose of the rigid flotation body 10, and the lure is cast in a conventional fashion. As the lure is retrieved through the water with intermittent pulls on the line, the lure alternately dives and rises to the surface in typical floater-diver fashion. In a slightly different form of the lure, often referred to as a sinker version, the rigid body 10 is altered in its characteristics so that, when no tension is applied to the fishing line attached to eyelet 22, the lure will sink within the fluid medium, and, on retrieve, the lure will normally run at some depth below the surface. As the lure is retrieved by the fisherman and moves toward him, the streamer element 12 undergoes a whipping or wiggling action as it moves from side to side. Water pressure acting against the side of the flat strip in the curved portion 50 of the streamer element 12 will tend to straighten out the streamer element, and in doing so, will place that side of the strip adjacent the elongated edge 52 in compression. The loading of the streamer element 12 in resilient deformation in this fashion is periodically relieved as the streamer element whips back and forth, giving a wiggling or swimming appearance to the entire composite lure. This action by the streamer element does not, however, interfere with, or deleteriously effect, the normal action of the flotation body 10. Thus, both the floating-diving action or the descending action of the sinker version, coupled with the whipping or swimming action of the resilient streamer element, function to attract fish which perceive the lure moving through the water. The weights 34 and 36 positioned in the hollow interior 32 of the body 10 afford optimum balance to the buoyancy of the flotation body, and also produce a rattling, clicking or knocking sound as the lure moves through the water and vibrates due to the swimming action of the lure body. The rattling sound affords a further attractive effect to the fish.

The elongated, flexible, resilient streamer element 12 may be made of various materials and in various colors. Also, its shape may be changed to some extent without substantial loss of the desirable action described. For example, the streamer element can comprise multiple segregated or bifurcated resilient elements, and the streamer can be of oval or circular cross-section, as well as flat. These forms, however, are generally less preferred than the curved flat streamer element illustrated in the drawing. On some occasions, a fisherman may wish to try different colors, since it is believed that under some conditions, fish will prefer one color to another. In such event, the streamer element 12 can be easily changed out by using a relatively sharply pointed implement, such as a screwdriver, pocket knife or the like, to force the anchoring pad 56 upwardly through the top opening 40 in the body 10 when the implement is extended through the lower opening 42. Once the anchoring pad 56 protrudes above the opening 40, it can be gripped by the fisherman, and the streamer element 12 removed by reversing its direction of movement through the passageway 44 formed in the tail portion 18 of the flotation body 10. A different color or shape of streamer element can then be inserted through the top opening 40 into the passageway 30 provided between the side walls of the lure, and threaded through the passageway 44 in the manner previously described. The small apertures 45 are provided to permit the fisherman to secure improvised streamers to the body 10 by positioning one end of such streamers in the passageway 39 and extending a straight pin or the like through the aligned apertures to prevent the improvised streamer from being pulled out through the passageway 44.

The foregoing description and the accompanying drawing are directed to a preferred embodiment of the present invention. It will be understood, however, that various changes and innovations may be effected in the described structure without departure from the basic principles which underlie the invention. For example, the inclusion of the opening 42 in the lower side of the body 10, while useful, is not essential to the securement of most of the advantages of the lure. It is also possible to provide flukes, or serrations on the lure body instead of the passageways 39 and 44, and secure the streamer element to the body by impalement or skewering. Changes and innovations of this type are therefore deemed to be circumscribed by the spirit and scope of the invention, except as the same may be necessarily limited by the appended claims or reasonable equivalents thereof.

What is claimed is:
1. A fishing lure comprising:
 a rigid flotation body of generally fish-like configuration having a forward end and having a rear end, said body defining a T-shaped passageway in said rear end portion, with a first opening to said passageway in the rear end of said body, a second opening to said passageway in the upper side of said flotation body and a third opening to said passageway in the lower side of said flotation body; and
 an elongated, flexible resilient streamer element detachably connected to the rear end of said rigid flotation body by detachable positioning in said T-shaped passageway, said elongated, flexible resilient streamer element including an anchoring pad located at one end of said streamer element and positioned in said T-shaped passageway, and further including a pointed end at the opposite end of said streamer element from said anchoring pad, one of said second and third openings being dimensioned to facilitate inserting the pointed end of said resilient streamer element through said one opening and through said first opening and the pulling of said resilient streamer element through said one opening to draw the anchoring pad of said streamer element through said one opening into said T-shaped passageway.

2. A fishing lure as defined in claim 1 wherein said anchoring pad includes:
a head; and
a neck of smaller transverse dimension than said head extending through said first opening.

3. A fishing lure comprising:
a rigid flotation body containing a sealed, watertight air chamber, and having a forward end and a rear end, said body defining a T-shaped passageway in the rear end portion thereof, and said body having a first opening to said T-shaped passageway in the rear end of said body and outside of said water-tight air chamber, a second opening to said passageway in an upper side of said flotation body and outside said water-tight air chamber, and a third opening to said passageway in a lower side of said flotation body and outside said water-tight air chamber and aligned with said second opening; and
an elongated, resilient streamer element detachably positioned in said passageway, said streamer element including:
a head at one end thereof positioned in a portion of said T-shaped passageway;
a neck of smaller transverse dimension than said head extending through said first opening and partially positioned in a portion of said T-shaped passageway; and
a pointed tail at the opposite end of said streamer element from said head;
said openings in said body and said streamer element head being dimensioned in relation to each other so that said pointed tail of said streamer element can be passed through said first and second openings, and said head can be passed through said second opening, but is larger than said first opening, whereby said streamer element can be positioned with the head thereof in a portion of said T-shaped passageway by threading the pointed tail, in sequence, through said second and first openings and then pulling the streamer element until said head is positioned within said T-shaped passageway.

4. A fishing lure comprising:
a hollow rigid flotation body of generally fish-like configuration and having a forward end, a rear end, an upper side and a lower side, said body having a relatively thin tail portion near the rear end thereof formed by the convergence of the sides, top edge and bottom edge of the body, and said body having a first opening at the rear end thereof, a second opening in the upper side of said body spaced forwardly from the rear end, and a third opening in the lower side of said body spaced forwardly from the rear end of said body and disposed in alignment with, and directly below said second opening;
a transverse partition wall extending across the hollow interior of the body immediately forward of said second and third openings and defining with the forward portion of the body a hollow, water-tight flotation chamber;
a diving plane secured to the forward portion of said body; and
an elongated, flexible resilient streamer element connected to the rear end of the rigid flotation body, said elongated rigid streamer element comprising:
a flat strip shaped as a hook and lying, in its relaxed state, in a vertical plane containing the front-to-rear axis of the rigid flotation body and bisecting said diving plane, said strip tapering to a point and being bounded by a convex side edge and a convergent concave side edge of greater length than said convex side edge;
a head disposed in said flotation body immediately rearwardly from said transverse partition wall and between said second and third openings, said head being of larger diameter than said first opening; and
a neck of smaller dimension than said head extending through said first opening and interconnecting said head and said flat strip.

5. A fishing lure comprising:
a hollow rigid flotation body of generally fish-like configuration and having a forward end, a rear end, opposed sides, a top edge and a bottom edge, said body having a relatively thin tail portion near the rear end thereof formed by the convergence of the sides, top edge and bottom edge of the body, said body having an opening at the rear end thereof;
a transverse partition wall extending across the hollow interior of the body forwardly of the rear end thereof and defining with the forward portion of the body, a hollow, water-tight flotation chamber;
a diving plane secured to the forward portion of said body; and
an elongated, flexible resilient streamer element connected to the rear end of the rigid flotation body, said elongated, flexible streamer element comprising:
a flat, resilient strip shaped as a hook and lying, in its relaxed state, in a vertical plane containing the front-to-rear axis of the rigid flotation body and bisecting said diving plane, said strip tapering to a point and being bounded by a convex side edge and a convergent concave side edge of greater length than said convex side edge;
a head disposed in said flotation body immediately forward of the opening in the rear end of said flotation body and rearwardly of said transverse partition wall, said head being larger than said opening to prevent passage of said head through said opening and retain said resilient streamer element connected to said rigid flotation body; and
a neck of smaller dimension than said head extending through said opening and interconnecting said head and said flat strip.

* * * * *